United States Patent
Leland et al.

(10) Patent No.: US 9,206,293 B2
(45) Date of Patent: Dec. 8, 2015

(54) POLYETHYENE AND ARTICLES PRODUCED THEREFROM

(71) Applicant: FINA TECHNOLOGY, INC., Houston, TX (US)

(72) Inventors: Mark Leland, Houston, TX (US); David Turner, Pasadena, TX (US); Leonardo Cortes Rodriguez, League City, TX (US); Mark Miller, Houston, TX (US); Ruby Curtis, League City, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 0 days.

(21) Appl. No.: 14/169,737

(22) Filed: Jan. 31, 2014

(65) Prior Publication Data

US 2015/0218322 A1    Aug. 6, 2015

(51) Int. Cl.
*C08J 5/18*     (2006.01)
*C08F 110/02*   (2006.01)
*C09D 123/06*   (2006.01)
*C08F 10/02*    (2006.01)
*C08L 23/04*    (2006.01)

(52) U.S. Cl.
CPC .......... *C08J 5/18* (2013.01); *C08F 110/02* (2013.01); *C09D 123/06* (2013.01); *C08F 10/02* (2013.01); *C08F 2500/03* (2013.01); *C08F 2500/26* (2013.01); *C08J 2323/06* (2013.01); *C08L 23/04* (2013.01); *C08L 2203/16* (2013.01)

(58) Field of Classification Search
CPC ................... C08F 10/02; C08L 23/04
USPC ........................................ 526/352
See application file for complete search history.

(56) References Cited

U.S. PATENT DOCUMENTS

| | | | |
|---|---|---|---|
| 4,271,060 A | 6/1981 | Hubby | |
| 4,543,399 A | 9/1985 | Jenkins et al. | |
| 4,588,790 A | 5/1986 | Jenkins et al. | |
| 4,780,264 A * | 10/1988 | Dohrer et al. | 264/556 |
| 5,001,205 A | 3/1991 | Hoel | |
| 5,028,670 A | 7/1991 | Chinh et al. | |
| 5,236,998 A | 8/1993 | Lundeen et al. | |
| 5,317,036 A | 5/1994 | Brady et al. | |
| 5,352,749 A | 10/1994 | Dechellis et al. | |
| 5,405,922 A | 4/1995 | Dechellis et al. | |
| 5,436,304 A | 7/1995 | Griffin et al. | |
| 5,456,471 A | 10/1995 | MacDonald | |
| 5,462,999 A | 10/1995 | Griffin et al. | |
| 5,525,678 A | 6/1996 | Mink et al. | |
| 5,589,555 A | 12/1996 | Zboril et al. | |
| 5,616,661 A | 4/1997 | Eisinger et al. | |
| 5,627,242 A | 5/1997 | Jacobsen et al. | |
| 5,665,818 A | 9/1997 | Tilston et al. | |
| 5,668,228 A | 9/1997 | Chinh et al. | |
| 5,677,375 A | 10/1997 | Rifi et al. | |
| 6,147,173 A | 11/2000 | Holtcamp | |
| 6,180,735 B1 | 1/2001 | Wenzel | |
| 6,207,606 B1 | 3/2001 | Lue et al. | |
| 6,211,105 B1 | 4/2001 | Holtcamp | |
| 6,242,545 B1 | 6/2001 | Jejelowo et al. | |
| 6,245,705 B1 | 6/2001 | Kissin | |
| 6,245,868 B1 | 6/2001 | Agapiou et al. | |
| 6,248,845 B1 | 6/2001 | Loveday et al. | |
| 6,271,323 B1 | 8/2001 | Loveday et al. | |
| 6,274,684 B1 | 8/2001 | Loveday et al. | |
| 6,300,436 B1 | 10/2001 | Agapiou et al. | |
| 6,339,134 B1 | 1/2002 | Crowther et al. | |
| 6,340,730 B1 | 1/2002 | Murray et al. | |
| 6,346,586 B1 | 2/2002 | Agapiou et al. | |
| 6,359,072 B1 | 3/2002 | Whaley | |
| 6,380,328 B1 | 4/2002 | McConville et al. | |
| 6,420,580 B1 | 7/2002 | Holtcamp et al. | |
| 6,713,189 B2 * | 3/2004 | Ho et al. | 428/523 |
| 6,777,520 B2 * | 8/2004 | McLeod et al. | 526/348.1 |
| 6,914,113 B2 * | 7/2005 | McLeod et al. | 526/352 |
| 6,984,698 B2 * | 1/2006 | McLeod et al. | 525/333.8 |
| 7,041,617 B2 * | 5/2006 | Jensen et al. | 502/113 |
| 7,632,907 B2 * | 12/2009 | Sukhadia et al. | 526/348.1 |
| 8,828,529 B2 * | 9/2014 | St. Jean et al. | 428/220 |
| 8,895,679 B2 * | 11/2014 | Hlavinka | 526/161 |
| 8,937,139 B2 * | 1/2015 | Hlavinka et al. | 526/211 |
| 2007/0098937 A1 | 5/2007 | Dekunder et al. | |
| 2008/0004411 A1 | 1/2008 | Sukhadia et al. | |
| 2014/0256901 A1 * | 9/2014 | Sukhadia et al. | 526/348.3 |

FOREIGN PATENT DOCUMENTS

EP    278 569 A2 *    8/1988    .............. B29C 47/86

OTHER PUBLICATIONS

International Search Report and Written Opinion issued in International Application No. PCT/US2015/013662, dated Apr. 17, 2015 (8 pages).

* cited by examiner

*Primary Examiner* — Rip A Lee

(57) ABSTRACT kiA polyethylene resin having an a parameter of between 0.20 and 0.40 and an MWD of between 1 to 6.

20 Claims, No Drawings

POLYETHYENE AND ARTICLES PRODUCED THEREFROM

CROSS-REFERENCE TO RELATED APPLICATIONS

Not applicable.

FIELD

The present disclosure is generally related to polyolefins and methods of making polyolefins. More specifically, the present disclosure is related to methods of making improved polyethylene films and coatings.

BACKGROUND

A traditional advantage of low density polyethylene (LDPE) over linear low density polyethylene (LLDPE) in extrusion processes such as cast film and extrusion coating is a lower level of neck-in during processing. "Neck-in" refers to the tendency of the film to draw in at the edges of a flat die. A lower level of neck-in may permit the production of a wider film or coating with the same die size. In addition, the neck-in may thicken the film at the edge of the extruded film or coating resulting in a higher level of waste material that must be trimmed.

However, LDPE may be limited in gauge to which it can be drawn. Traditionally, at lower gauges, the LDPE film tears and thinner film or coatings in certain situations cannot be produced. LLDPE typically has a greater capability to be drawn to thinner films and coatings. With respect to the final film or coating properties, some properties are improved by LLDPE and others by LDPE.

SUMMARY

One embodiment of the present disclosure is directed to a resin. The resin is a polyethylene having an a parameter of between 0.20 and 0.40 and an MWD of between 1 to 6.

Another embodiment of the present disclosure is directed to a cast film or coating. The cast film or coating includes a polyethylene resin having an a parameter of between 0.28 to 0.36 and an MWD of between 2 and 3.5

DETAILED DESCRIPTION

The following disclosure provides many different embodiments, or examples, for implementing different features of various embodiments. Specific examples of components and arrangements are described below to simplify the present disclosure. These are, of course, merely examples and are not intended to be limiting.

Disclosed herein are embodiments of polyethylene polymer that are effective in the manufacture of certain articles, in particular that of blown films, either by themselves, or in combination with other polymers. These polyethylene polymers are formed by particular metallocene catalysts.

Metallocenes may include organometallic compounds containing two cyclopentadienyl rings bonded to a metal atom. Metallocene catalysts generally include a transition metal situated between two organic rings. Metallocene catalysts are homogenous (soluble in hydrocarbons), whereas Ziegler-Natta catalysts are heterogeneous. Metallocene catalysts may be characterized as coordination compounds incorporating one or more cyclopentadienyl (Cp) groups (which may be substituted or unsubstituted, each substitution being the same or different) coordinated with a transition metal through π bonding. The substituent groups on the Cp groups may be linear, branched or cyclic hydrocarbyl radicals. The cyclic hydrocarbyl radicals may further form other contiguous ring structures, including, but not limited to, indenyl, azulenyl and fluorenyl groups. These contiguous ring structures may be further substituted or unsubstituted by hydrocarbyl radicals, such as $C_1$ to $C_{20}$ hydrocarbyl radicals. For instance, in certain embodiments of the present disclosure, a rac-ethylenebis(4,5,6,7-tetrahydro-1-indenyl)zirconium dichloride metallocene catalyst was used to manufacture the polyethylene polymer.

Any desired polymerization process(es) may be carried out over the desired polymerization catalyst(s). The equipment, process conditions, reactants, additives and any other materials that may be used in the polymerization process(es) can vary depending on the desired composition and properties of the polymer being formed. The polymerization processes may include solution phase, gas phase, slurry phase, bulk phase, high pressure processes or any combinations thereof. (See, U.S. Pat. No. 4,271,060, U.S. Pat. No. 5,001,205, U.S. Pat. No. 5,236,998 and U.S. Pat. No. 5,525,678, U.S. Pat. No. 5,589,555; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, each of which are incorporated by reference herein in their entirety.)

Gas phase polymerization processes useful with the present disclosure may include a continuous cycle system. A continuous cycle system may include a cycling gas stream, which may include a recycle stream or other fluidizing medium, which is heated in a reactor by the heat of polymerization. The heat is then removed from the cycling gas stream by a cooling system external to the reactor. The cycling gas stream containing one or more monomers may be continuously cycled through a fluidized bed in the presence of a catalyst under reactive conditions. The cycling gas stream may be withdrawn from the fluidized bed and recycled back into the reactor. A polymer product may be simultaneously withdrawn from the reactor while fresh monomer may be added to replace the polymerized monomer (polymer product). The gas phase process may be operated under reactor pressures ranging from 100 to 500 psig, from 200 to 400 psig, or from 250 to 350 psig. The gas phase process may be operated under reaction temperatures ranging from 30 to 120° C., from 60 to 115° C., from 70 to 110° C., or from 70 to 95° C. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, each of which are incorporated by reference herein in their entirety.)

Slurry phase processes may include forming a suspension of solid, particulate polymer in a liquid polymerization medium, and adding monomers, catalyst and optionally hydrogen to the medium. The suspension may be intermittently or continuously removed from the reactor. The removed suspension may then be subjected to separation step where the volatile components can be separated from the polymer and recycled to the reactor. The suspension may further include a diluent, such as a $C_3$ to $C_7$ alkane (e.g., hexane or isobutene), which is generally liquid under the conditions of polymerization and relatively inert. A bulk phase process is similar to that of a slurry process, except that in the bulk phase process the liquid medium is also the reactant (e.g., monomer). In an embodiment, the polymerization process may be a bulk process, a slurry process or a bulk slurry process.

In an embodiment, a slurry process or a bulk process may be carried out continuously in one or more loop reactors. The catalyst, as slurry or as a dry free flowing powder, may be injected intermittently or continuously into the reactor loop. In an alternative embodiment, hydrogen may be added to the process in order to aid in molecular weight control of the resultant polymer. The loop reactor may be operated under pressures ranging from 27 to 50 bar or from 35 to 45 bar and under temperatures ranging from 38 to 121° C. In an embodiment, reaction heat may be removed through the wall of the loop reactor by any suitable method, such as by a double-jacketed pipe or heat exchanger.

In an embodiment, the slurry polymerization process may be carried out in a stirred reactor, such as a continuously stirred tank reactor (CSTR). Other types of polymerization processes may be used, such as stirred reactors in series, parallel or combinations thereof. Upon leaving the reactor, the polymer may be subjected to further processing, such as addition of additives and/or extrusion.

Polyethylene made in accordance with certain embodiments of the present disclosure may have a density ranging from 0.915 to 0.960 g/cm$^3$, from 0.918 to 0.950 g/cm$^3$, or about 0.920 to 0.940 g/cm$^3$ as measured by ASTM D792. In certain embodiments of the present disclosure, the polyethylene may have a MI2 of between 1.0 and 16.0, or from 2.0 to 8.0 or from 3.0 to 6.0 as measured using the procedures of ASTM D1238 (190° C./2.16 kg). The a parameter ranges from about 0.20 to 0.40, or from 0.25 to 0.38 or from 0.28 to 0.36. The a parameter (also known as the breadth parameter or the rheological breadth parameter) is described in U.S. Pat. No. 6,914,113, which is incorporated herein fully by reference. MWD (Mw/Mn) as determined by GPC ranges from 1 to 6, or from 1.5 to 5 or from 2 to 3.5.

The polyethylene of the present disclosure may be useful in applications known to one skilled in the art, including forming operations (e g, film, sheet, pipe and fiber extrusion and co-extrusion as well as blow molding, injection molding and rotary molding, and extrusion coating). Films include blown, oriented, or cast films formed by extrusion, co-extrusion, or by lamination. Useful films are those such as shrink films, cling films, stretch films, sealing films, heavy-duty bags, grocery sacks, food packaging, medical packaging, commercial packaging, industrial liners, and membranes. Fibers include slit-films, monofilaments, melt spinning, solution spinning and melt blown fiber. Useful fibers are those such as woven or non-woven fibers that may be used to make sacks, bags, rope, twine, carpet backing, carpet yarns, filters, diaper fabrics, medical garments and geotextiles. Extruded articles include medical tubing, wire and cable coatings, and sheets, such as thermoformed sheets (e.g., plastic corrugated cardboard), geomembranes and pond liners. Molded articles include single and multi-layered constructions in the form of bottles, tanks, drums, large hollow articles, rigid food containers and toys.

In an embodiment, the polyethylene of the present disclosure is used to form films. In another embodiment, the polyethylene is used to form cast films and extrusion coatings. When used to form cast films or coatings on the surface of solid substrates such as polymeric films, paper, or cardboard, the polyethylene produced in accordance with the present disclosure exhibits processing characteristics in some regards similar to LDPE and in other regards similar to LLDPE.

Water vapor transmission rate of the films made in accordance with the present disclosure ranged from 0.80 to 1.30 or from 0.85 to 1.20 or from about 0.90 to about 1.1 g/100 in$^2$/day/mil, as measured by ASTM 1249.

With respect to stress to strain, the 1% Secant Modulus in the machine direction, films made in accordance with the present disclosure is from 16,000 to 24,000 psi, or from 17,000 to 23,000 psi or from 18,000 to 22,000 psi as measured by ASTM D882, A.

With respect to tensile strength yield in the machine direction, films made in accordance with the present disclosure are from 800 to 1400 psi, or from 900 to 1300 psi or from 1000-1200 psi as measured by ASTM D882, A. With respect to tensile strength break in the machine direction, films made in accordance with the present disclosure are from 3000 to 6000 psi, or from 3500 to 6000 psi or from 4000 to 5500 psi as measured by ASTM D882, A. With respect to tensile strength yield in the transverse direction, films made in accordance with the present disclosure are from 800 to 1400 psi, or from 900 to 1300 psi or from 1000-1250 psi as measured by ASTM D882, A. With respect to tensile strength break in the transverse direction, films made in accordance with the present disclosure are from 2500 to 6500 psi, or from 3000 to 6000 psi or from 3500 to 5500 psi as measured by ASTM D882, A. With respect to elongation yield in the machine direction, films made in accordance with the present disclosure are from 7 to 17%, or from 8 to 16% or from about 9 to 15% as measured by ASTM D882, A. With respect to elongation break in the machine direction, films made in accordance with the present disclosure are from 400 to 1200%, or from 500 to 1100% or from 600 to 1000% as measured by ASTM D882, A.

Example

An experiment was conducted on a pilot scale cast film line. A cast film was produced from different polyethylene polymers and the processing performance of each assessed. These polyethylene polymers were a polyethylene manufactured from a rac-ethylenebis(4,5,6,7-tetrahydro-1-indenyl) zirconium dichloride metallocene catalyst in accordance with the present disclosure (having a melt index (MI2) of 4.5 and a density of 0.925 g/cc, ("Sample") an LDPE with a melt index (MI2) of 4.5 and a density of 0.925 g/cc, and an LLDPE with a melt index (MI2) of 2.0 and a density of 0.919 g/cc.

The extruder used to produce the cast films was a Davis-Standard Mini-Co-Extrusion line equipped with two one inch diameter satellite extruders and a one and one-half inch diameter main extruder. Only the main extruder was utilized at a maximum throughput of 40 lbs/hour. The main extruder was mated with a Cloeren feed block and ten inch wide coat hanger die. The die was mounted at a 45 degree angle so that the melt curtain fell vertically onto a chill roll.

The extruder barrel was equipped with four heat zones: Zone 1=400° F., Zone 2=410° F., Zone 3=420° F., and Zone 4=430° F. Melt temperature was maintained at 413° F. Feed block adapter temperature was 338° F., and feed block temperature was 397° F. The die was maintained at 450° F. Extruder screw speed was run at 27.6 rpm.

Neck-in was measured as the difference in the width in inches of the melt curtain as it exited the die and its width in inches as it adhered to the chill roll. In this example, the melt curtain for the LLDPE was 10 inches while the width of the film was 8 inches, therefore the neck-in was 2 inches. Extrusion stability was based upon the stability of the width of the melt curtain during extrusion.

The ability of the resin to be drawn down into a thinner film was quantified by incrementally increasing the chill roll and winder speed until the film broke. The chill roll speed was recorded when the film broke. As reflected in Table 1 below, the faster the roll speed, the further the resin could be drawn down. The Sample had a level of neck-in closer to that of LDPE while showing draw down characteristics more similar to LLDPE.

TABLE 1

| Material | Neck-in (inches) | Roll speed (FPM) |
|---|---|---|
| LDPE | 0.75 | 20 |
| Sample | 1 | 70 |
| LLDPE | 2 | 70 |

Using the equipment described above, the three types of polyethylene were made into films at 2 mil thickness to compare relative rheological properties. As shown in Table 2 below, for all of the properties tested, films produced with the Sample either exceeded those of LLDPE and LDPE or were consistent with the better of these two materials. Specifically, in the case of optics, haze and gloss values of films produced with the Sample were more similar to those of LLDPE than LDPE with LLDPE being the better of the two. Similarly, the puncture energy and machine direction tensile strength of the Sample were more similar in value to LLDPE. In the case of water vapor transmission rate (WVTR), dart impact strength, and tear resistance, the sample resulted in the best film properties of all three materials.

TABLE 2

| Test | Values | LLDPE | Sample | LDPE | Units |
|---|---|---|---|---|---|
| Optics | Haze | 6.2 | 8.3 | 13.1 | % |
|  | Gloss (45°) | 78 | 72 | 38 | % |
| WVTR | Permeation (per mil unit) | 1.14 | 0.96 | 1.11 | g/100 in²/day/mil |
| Impact | Falling Dart | 181 | 200 | 144 | g |
| Puncture | Total Energy | 2.436 | 2.016 | 1.238 | in-lbs |
|  | Force @ Break | 3.15 | 3.34 | 3.34 | lbs |
|  | Elongation @ Break | 1.11 | 0.94 | 0.69 | in |
| Secant Instron | 1% Secant Modulus, MD | 20200 | 20700 | 18100 | psi |
|  | Tensile Strength, Yield, MD | 1200 | 1100 | 1000 | psi |
|  | Tensile Strength, Break, MD | 5000 | 4400 | 1800 | psi |
|  | Tensile Strength, Yield, TD | 1140 | 1140 | 1100 | psi |
|  | Tensile Strength, Break, TD | 3700 | 4700 | 2600 | psi |
|  | Elongation, Yield, MD | 12.8 | 12.4 | 11.5 | % |
|  | Elongation, Break, MD | 785 | 796 | 549 | % |
| Elmendorf Tear | Tear Resistance - MD | 350 | 390 | 420 | g |
|  | Tear Resistance - TD | 470 | 640 | 270 | g |
|  | Tear Ratio TD/MD | 1.4 | 1.6 | 0.6 |  |

A rheological analysis was performed on each of the three films. A TA Instruments ARES strain rheometer was utilized with parallel plate geometry to collect shear response data at three temperatures (230, 200, 170° C.) and multiple frequencies. Time-Temperature super-position was then used to shift the three shear response data sets to a single temperature creating a master curve. The Carreau-Yasuda (CY) viscosity model was then fit to the master curve yielding the CY parameters describing the curve.

The Carreau-Yasuda fit of the data separated the shear thinning behavior into relaxation time and rheological breadth components. The results of the fit are shown below in Table 3. The data demonstrates that the breadth parameter of the Sample is closer to that of LDPE than LLDPE. The breadth parameter, which represents the rheological breadth of a material, is consistent with the lower neck-in seen in processing experiments. At the same time, the higher degree of orientation seen in the tear data (tear ratio in Table 2) in the Sample is similar to LLDPE. These results indicate a greater tendency of the material to orient during shear. To better explain this property, the molecular weight distribution (MWD) is calculated as the ratio of the weight average molecular weight (Mw) to the number average molecular weight (Mn) from GPC data taken relative to polystyrene standards was calculated for all three materials. This value appears in Table 3 below. The lower values such as those seen in the Sample and LLDPE give rise to a material which orients more during shear allowing the material to be drawn down to thinner gauges in a cast film or coating process than are possible with LDPE.

TABLE 3

| Parameter |  | Sample | LDPE | LLDPE | Units |
|---|---|---|---|---|---|
| Activation Energy | $E_a$ | 30.2 | 47.2 | 27.7 | kJ/mol |
| Power Law | n | 0 | 0 | 0 |  |
| Zero Shear Viscosity |  | 2255 | 4612 | 5890 | Pa s |
| Relaxation Time |  | 0.001 | 0.014 | 0.01 | s |
| Breadth Parameter | a | 0.33 | 0.29 | 0.40 |  |
| Temperature | $T_o$ | 190 | 190 | 190 | ° C. |
| MWD (Mw/Mn) |  | 2.6 | 6.6 | 3.9 |  |

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

While the foregoing is directed to embodiments, versions and examples of the present disclosure, which are included to enable a person of ordinary skill in the art to make and use the disclosures when the information in this patent is combined with available information and technology, the disclosure is not limited to only these particular embodiments, versions and examples. Also, it is within the scope of this disclosure that the aspects and embodiments disclosed herein are usable and combinable with every other embodiment and/or aspect disclosed herein, and consequently, this disclosure is enabling for any and all combinations of the embodiments and/or aspects disclosed herein. Other and further embodiments, versions and examples of the disclosure may be devised without departing from the basic scope thereof and the scope thereof is determined by the claims that follow.

What is claimed is:

1. A resin comprising:
   polyethylene having a rheological breadth parameter (a parameter) of between 0.20 and 0.40, a molecular weight distribution (MWD) of between 2 and 3.5, and a density of from about 0.918 to 0.950 g/cm$^3$ as measured by ASTM D792;
   wherein the water vapor transmission rate of a film made of the polyethylene ranges from 0.90 to 1.30 g/100 in$^2$/day/mil, as measured by ASTM 1249.

2. The resin of claim 1, wherein the a parameter is between 0.28 to 0.36.

3. The resin of claim 1, wherein the polyethylene has a density of from about 0.920 to 0.940 g/cm$^3$ as measured by ASTM D792.

4. The resin of claim 1, wherein the water vapor transmission rate of a film made of the polyethylene ranges from 0.90 to 1.1 g/100 in$^2$/day/mil, as measured by ASTM 1249.

5. The resin of claim 1, wherein the polyethylene has an MI2 of between 1 and 16 as measured by ASTM D1238 (190° C./2.16 kg).

6. The resin of claim 5, wherein the polyethylene has an MI2 of between 3 and 6 as measured by ASTM D1238 (190° C./2.16 kg).

7. The resin of claim 1, wherein the polyethylene is a metallocene catalyzed polyethylene.

8. A cast film made in accordance with claim 1, wherein the polyethylene is a metallocene catalyzed polyethylene.

9. A coating material comprising the resin of with claim 1.

10. A cast film or coating comprising:
    a polyethylene resin having a rheological breadth parameter (a parameter) of between 0.28 to 0.36, a molecular weight distribution (MWD) of between 2 and 3.5, and a density of from about 0.918 to 0.950 g/cm$^3$ as measured by ASTM D792;
    wherein the water vapor transmission rate of the cast film or coating ranges from 0.90 to 1.30 g/100 in$^2$/day/mil, as measured by ASTM 1249.

11. The cast film or coating of claim 10, wherein the polyethylene resin has a density of from about 0.920 to 0.940 g/cm$^3$ as measured by ASTM D792.

12. The cast film or coating of claim 10, wherein the polyethylene resin has an MI2 of between 3 and 6 as measured by ASTM D1238 (190° C./2.16 kg).

13. The cast film or coating of claim 10, wherein the water vapor transmission rate is from 0.90 to 1.20 g/100 in$^2$/day/mil, as measured by ASTM 1249.

14. The cast film or coating of claim 10, wherein the 1% Secant Modulus in the machine direction is from 17,000 to 23,000 psi as measured by ASTM D882, A.

15. The cast film or coating of claim 10, wherein the tensile strength yield in the machine direction is from 900 to 1300 psi as measured by ASTM D882, A.

16. The cast film or coating of claim 10, wherein the tensile strength yield in the transverse direction is from 900 to 1300 psi as measured by ASTM D882, A.

17. The cast film or coating of claim 10, wherein the elongation yield in the machine direction is from 8 to 16% as measured by ASTM D882, A.

18. The cast film or coating of claim 10, wherein the elongation break in the machine direction is from 500 to 1100% as measured by ASTM D882, A.

19. The cast film or coating of claim 10, wherein the polyethylene resin is a metallocene catalyzed polyethylene resin.

20. A cast film or coating comprising:
    a metallocene catalyzed polyethylene resin having a rheological breadth parameter (a parameter) of between 0.20 to 0.40, a molecular weight distribution (MWD) of between 1 and 6, and a density of from about 0.918 to 0.950 g/cm$^3$ as measured by ASTM D792;
    wherein the cast film or coating exhibits a water vapor transmission rate of from 0.90 to 1.30 g/100 in$^2$/day/mil, as measured by ASTM 1249.

* * * * *